United States Patent Office 3,136,643
Patented June 9, 1964

3,136,643
DEHYDRATED POTATO PROCESS
Robert C. Reeves, Wyckoff, and Frank Hollis, Jr., Hillsdale, N.J., assignors to General Foods Corporation, White Plains, N.Y., a corporation of Delaware
No Drawing. Filed July 20, 1962, Ser. No. 211,405
15 Claims. (Cl. 99—207)

This invention relates to the preparation of dehydrated mashed potatoes from raw whole potatoes.

The desirability of producing dehydrated mashed potatoes which can be reconstituted for consumption by addition of water (with or without milk, butter, etc.) has long been appreciated. Various methods of preparing such a product have been proposed. However, the various products which have been prepared have not been entirely satisfactory.

One disadvantage which has characterized certain dehydrated potato products heretofore prepared is their uncertain and comparatively short shelf-life. The shelf-life of dehydrated mashed potatoes is measured by the amount of darkening or browning which is present in the product. A highly desirable product would be white after an extended period of time, while the undesirable product will become partially or completely brown upon storage. Browning is indicative of deterioration and is accompanied by undesirable odor and flavor changes in the dehydrated product.

Another disadvantage is that the dehydrated potato products presently being sold to the consumer produce pasty, lumpy mashed potatoes. Such products are very undesirable as they do not closely resemble freshly mashed cooked potatoes which have a mealy, granular texture or body.

Still another disadvantage is that the yield of dehydrated potato products presently on the market is relatively low due to high losses of potato solids during peeling.

Yet another disadvantage is that when dehydrated potatoes are rehydrated, the desirable flavor normally found in freshly prepared mashed potatoes is absent and quite often an unpleasant "hay" flavor is present.

It is known that in the preparation of such a product and particularly in cooking and mashing, it is necessary for good results to avoid substantial damage to the potato cells. The cell walls enclose starch granules which swell up and burst under the influence of heat and moisture, the starch within the cells thus being "gelatinized." Proper mashing dissociates these cells either as individuals or as very small aggregates to produce a product that can be described as mealy, granular, or crystalline, and this condition is necessary if the product is to be dried and then reconstituted into mashed potatoes of good quality. At the same time this necessary condition must be attained without substantial damage to the cell walls by cooking, mashing, or otherwise, since the gelatinized starch would thereby be released and the reconstituted product would likely be a glutinous or pasty mass wholly unlike freshly prepared mashed potatoes from the standpoint of texture and palatability.

It is an object of this invention to provide complete or substantially complete homogeneity throughout the mass of cooked potato prior to drying. Thus it is an objective of the present invention that variations in the characteristics of the dried product be minimized if not completely eliminated, and that a reconstituted product of uniform, non-pasty, non-lumpy texture and consistency be obtained.

Another object is to obtain the substantially complete separation from one another of those potato cells which contain a majority of browning precursors (soluble reducing sugars and proteins) without substantial damage to the cell walls so that such potato cells can be employed in the production of dehydrated mashed potatoes.

Yet another object is to increase the yield of potato solids obtained from the raw potatoes and usable in the production of dehydrated mashed potatoes.

Still another object is to obtain a dehydrated potato product which when rehydrated possesses the flavor of freshly prepared, cooked, mashed potatoes and does not possess any undesirable hay flavor.

It has now been found that the above results can be secured by classifying raw or cooked potatoes into a core fraction and peel fraction. By classifying is meant the division of potatoes into a core fraction containing the bulk of the core portion and a peel fraction containing the peel, eyes, rot and some of the core portion. The peel fraction which is cooked before or after classification is mashed to produce discrete free potato cells, aggregates thereof, and particles of peel, eyes and rot. Water is then added to the mashed peel fraction to form a slurry and the slurry is then screened to remove the peel, eyes and rot. The slurry of now clean potato cells and small aggregates thereof is dewatered thereby removing free starch, undesirable soluble reducing sugars and proteins. The dewatered slurry is combined with the core which was separately mashed, and dried in granular form or riced to form filaments and then dried.

The potatoes may be sliced and leached prior to cooking and classification. It has been noted that when potato slices are leached prior to cooking and classification considerable improvement in the storage stability of the dehydrated mashed potatoes is obtained. This is attributed to the leaching out of limited amounts of soluble reducing sugars and proteins from the potato slices. The leaching, although insufficient to remove the bulk of the soluble reducing sugars and proteins (browning precursors) from the potato portion most proximate to the peel (peel fraction), is sufficient to remove the bulk of the browning precursors from the core portion which naturally contains less browning precursors than the peel fraction.

Although classification can be effected before or after cooking, it is desirable to classify the potato slices subsequent to cooking so that the slices are cooked in their skins which results in a dehydrated mashed potato product with a highly preferable strong potato flavor. The potato flavor appears to develop in the peel portion of the potato during cooking as potatoes peeled prior to cooking do not develop the flavor. If the potatoes are not classified until after cooking then a good part of the flavor which develops is retained in the core fraction which is not subjected to the same process conditions as the peel fraction. If desired, the level of flavor in the dehydrated product can be decreased by classifying the potatoes prior to cooking or by processing as a peel fraction a major portion of the potatoes classified after cooking.

It is desirable in the coure of producing a slurry to employ at least one part by weight of water per part by weight of potato. The use of lesser amounts of water has a detrimental effect upon the screening operation. The use of excessive amounts of water in slurrying, e.g. above 10 parts by weight of water per part by weight of potato, is detrimental in that an excess of potato flavor and/or solids is lost when the potatoes are dewatered.

It has also been noted that the potatoes prepared by earlier disclosed processes all tend to deteriorate rapidly on storage and have a relatively short shelf-like. However, this invention by exposing the largest possible potato cell surface area of the peel fraction (which contains the bulk of the soluble reducing sugars and proteins in the potato) to the slurry water removes the maximum amount of reducing sugars and proteins from the cells and thereby increases the shelf-life of the potato product considerably and decreases the probability of hay flavor developing.

Furthermore, it has been found by those skilled in the art that excessive rupture, e.g. 25%, of the potato cells occurs when one uses water to slurry potatoes. U.S. Patent 2,490,431 to Greene et al. discloses the necessity of freezing the potatoes and using dissolved solids such as sodium chloride in the slurry solution to prevent undue rupture of the cell walls. However, it has been found that by proper treatment of the potatoes it is possible to process the potatoes without the need of freezing or the addition of dissolved solids to avoid the excessive rupture and resulting pastiness from occurring and at the same time improve the yield of dehydrated mashed potato solids. This desired product is obtained by the favorable processing of a peel fraction so as to produce discrete free potato cells, aggregates thereof and particles of peel, eyes and rot which in the form of a slurry allow the removal of such peel, eyes and rot from said slurry and the subsequent removal of ruptured free starch, soluble reducing sugars and proteins in a dewatering operation. By processing the peel fraction in such a way that the potato cells and aggregates thereof can be readily separated from the undesirable portion of the peel fraction, undue rupture of the cell walls and excessive loss of desirable potato flavor is prevented and at the same time the free starch is removed from cells which may have ruptured resulting in a product which is free of pastiness and lumps when it is rehydrated.

If raw whole potatoes are cooked before being classified into a core fraction and a peel fraction, then such classification may be effected in a number of different ways, the preferred way being to classify cooked whole potatoes by crushing or mashing them in crushing rolls or crushing belts and then placing the crushed cooked potatoes onto a vibrating screen whereby they are classified into a peel fraction and a core fraction. Such classification permits the resultant dehydrated potatoes to retain the maximum desirable potato flavor. Alternative methods of classification would be coarse peeling of raw potatoes to obtain a core fraction and a peel fraction or cutting cores from sliced raw potatoes to obtain a core fraction and a peel fraction.

The potatoes are preferably first thoroughly washed and sliced about ¾ inch thick. The washed, sliced raw potatoes are then leached in water at about 150°–180° F. for about 5–15 minutes. The leached slices of raw potato are cooked by any suitable method which will not damage the potato cells, the preferred method from the standpoint of convenience being steam cooking for the necessary time. With slices of the size mentioned above, about 15–30 minutes cooking is required. Even pressure cooking is permitted provided the pressure of the steam is gradually reduced as the cooking proceeds and is caused to become atmospheric by the time cooking is completed. Whether boiling, steaming, or any other method is employed, cooking should be continued until the potato slices are completely cooked throughout, but should not be carried to the point where the starch begins to coalesce as a result of overswelling and bursting of the cells. The cooked potato slices are then passed through crushing rolls or belts having a setting of ⅛–⅜ inch between the rolls. The potato slices are fed to the crushing rolls or belt at a rate such that only one slice thickness can pass through so as to avoid imbedding of peel into adjacent slices, the slices thus being partially crushed; the peel, eyes and rot remain intact, with portions of clean potato adhering thereto.

The crushed slices are then placed on a vibrating classifier ¼–⁷⁄₁₆-inch mesh screen for approximately 3 minutes so that 30–70% of the potato passes through as a clean core fraction whereas the peel fraction containing the peel, eyes and rot with a portion of clean potato remains on top of the screen.

The peel fraction is crushed in crushing rolls having a setting of 0.018–0.024 inch and to it is added sufficient water to form a slurry of the peel, eyes, rot and clean potato particles. Preferably, 1–2 parts of water to 1 part of potato are used. This slurry is then passed through a U.S. #6 to 14 standard mesh screen, preferably a U.S. #8 standard mesh screen, in order to remove the peel, eyes and rot. After the greater portion of peel, eyes and rot have been removed, a slurry containing clean potato particles with some amounts of free ruptured starch, soluble reducing sugars, proteins, and some specks of peel, eyes and rot remain. The slurry is then passed through a pulper having a screen with 0.018 to 0.025-inch holes, and preferably 0.020 inch which permits the individual potato granules to pass through and subdivides large potato aggregates so that they may pass through while retaining the specks of peel, eyes and rot. Due to the fact that the potato cells exist in the slurry as individual cells or small aggregates of cells, the maximum cell surface area is exposed to water permitting removal of the maximum amount of soluble proteins and reducing sugars from the cells. The slurry is then dewatered, preferably by vacuum filtration, removing substantially all of the free ruptured starch, soluble reducing sugars, and some of the soluble proteins, resulting in clean potato granules substantially free of soluble reducing sugars and some of the soluble proteins.

The cooked, crushed core fraction is recrushed after passing through the vibrating classifying screen in crushing rolls having 0.035–0.050 inch clearance.

The dewatered peel fraction is homogeneously combined with the crushed core fraction by mashing.

The combined mash may be dried as individual granules or may preferably be riced or extruded as shreds and then dried. In ricing or extruding the mash, it is important that the shreds be of sufficient size to prevent appreciable cell damage during passage through the extrusion apparatus. The minimum permissible size of shred will vary somewhat with the type of extruding apparatus, but will generally be of the order of ¹⁄₁₀-inch diameter. Shreds of greater diameter may be used, but from a practical standpoint should not exceed ¼ inch diameter.

The granules or extruded shreds are preferably dried under such conditions that moisture is removed from their surfaces at a rate sufficiently faster than it can diffuse from their interiors so as to set them in substantially their granular or extruded size. In other words, the outer surfaces of the granules or shreds must have moisture removed at a sufficiently rapid rate as to be made rigid against collapse throughout dehydration. Under these conditions the granules or shreds will shrink outwardly away from their centers enough to assume a distinctly hollow form, but at the same time a relatively thick highly porous tubular wall or shell is formed without cell damage.

Broadly speaking, the drying of the shreds may be carried out in any manner which will insure the aforementioned drying results. It is preferred, however, to dry as rapidly as possible, and in practice it has been found satisfactory to first deposit an interlacing open mass of shreds on a supporting screen and thereafter circulate relatively dry heated air at a high velocity, e.g., at a rate of the order of from 150–300 linear feet per minute, through the mass of shreds carried on the screen. When drying by this method, air drying temperatures from 180° F. to as high as 280° F. may be used without causing bursting of the cells or exterior damage to the shreds such as scorching. In view of the rapidity of drying, the shreds do not even begin to approach the critical temperature at which further cooking is initiated, which is believed to be below 212° F. The shreds may be dried in from 10–30 minutes depending on the depth of layer deposited on the screen.

In general, it will be more desirable to dry the granules or shreds to a moisture content of from 3–7%, the optimum range being from 3–5%.

The invention is described in greater detail in connection with examples of its practical application, but it is to be expressly understood that these examples are only for purposes of illustration and are not to be construed as a definition of the limits of the invention:

*Example 1*

Twenty pounds of Idaho Russet Burbank potatoes having 22% solids were thoroughly washed in a reel washer using cold water at room temperature and then sliced about ¾-inch thick. The sliced potatoes were leached for 15 minutes in water having a temperature maintained at 170° F. The leached slices were cooked by steam cooking for a period of 21 minutes at a temperature of about 210–212° F. in a steam chamber. The cooked potato slices were passed through smooth surface crushing rolls having a setting of 5/16 inch between the rolls so that the cooked slices were partially crushed. The peel, eyes and rot remained intact and had adhering to them some clean potato. The crushed slices were placed on a classifier vibrating 7/16-inch mesh screen, vibrating at a rate of about 450 vibrations per minutes so that about 50% by weight of the potato passed through the screen, the peel, eyes, rot and remaining clean potato being retained on top of the screen. The fraction of the potato which remained on the vibrating classifier screen and weighed about 9½ pounds was recrushed in crushing rolls and was then mixed with 1 part of water at a temperature of 50° F. per 1 part of potato by weight to form a slurry. The slurry of peel, eyes, rot and clean potato particles was passed through a U.S. #8 standard mesh screen while about 0.5 part of water per part of potato were sprayed on a vibrating screen which removed the major portion of the peel, eyes and rot as overs from the slurry. The slurry was then passed through a Langsenkamp pulper having a screen with 0.020 inch holes which removed the remaining specks of peel, eyes and rot. This slurry was then dewatered by filtration in a vacuum rotary filter so that the dewatered potatoes in the peel fraction contained 16% solids (to permit a combined peel and core fraction of about 21% solids), thereby removing free starch, reducing sugars and proteins with the slurry water. The dewatered clean peel (slurry) fraction was added to the cooked core fraction which passed through the vibrating classifier screen and was then crushed in crushing rolls having a setting of about 0.042 inch. The combined peel and core fractions were then mixed and mashed in a Hobart mixer so that a homogeneous mixing was effected. The solids content of combined mash was about 21%. The mash was then extruded through a ricer to form shreds. The shreds were then dried in a Proctor and Schwartz tray drier for 15 minutes at an initial temperature of 250° F. which is gradually reduced to a final temperature of 180° F. and a constant air velocity of 250 linear ft./min. About 4 pounds of dried potato shreds were obtained.

Although the present invention has been described in part by means of a specific example, reference should be had to the appended claims for a definition of the scope of the invention.

This application is a continuation-in-part of Serial No. 140,234, filed September 25, 1961, now abandoned.

What is claimed is:

1. A process for preparing dehydrated mashed potatoes from raw potatoes leached at about 150° F.–180° F. to remove undesirable browning precursors therefrom wherein the potatoes are not frozen during processing which comprises dividing potatoes into a core fraction and a peel fraction containing peel, eyes and rot; said core fraction and said peel fraction being cooked after leaching and before subsequent mashing; mashing said peel fraction to produce discrete free potato cells, aggregates thereof, and particles of peel, eyes and rot; adding water to said mashed peel fraction thereby forming a slurry; removing all of the peel, eyes and rot from said slurry; dewatering said slurry thereby removing free starch, soluble reducing sugars and proteins; mashing said core fraction; combining said mashed core fraction in an unslurried form with said dewatered peel fraction so that a homogeneous mixture is obtained; and drying said mixture.

2. A process for preparing dehydrated mashed potatoes from raw potatoes leached at about 150° F.–180° F. to remove undesirable browning precursors therefrom wherein the potatoes are not frozen during processing which comprises cooking raw potatoes; subsequently dividing said cooked potatoes into a core fraction and a peel fraction containing the peel, eyes and rot; mashing said peel fraction to produce discrete free potato cells, aggregates thereof, and particles of peel, eyes and rot; adding water to said mashed peel fraction thereby forming a slurry; removing all of the peel, eyes and rot from said slurry; dewatering said slurry thereby removing free starch, soluble reducing sugars and proteins; mashing said core fraction; combining said mashed core fraction in an unslurried form with said dewatered peel fraction so that a homogeneous mixture is obtained; and drying said mixture.

3. A process for preparing dehydrated mashed potatoes from raw potatoes leached at about 150° F.–180° F. to remove undesirable precursors therefrom wherein the potatoes are not frozen during processing which comprises dividing said raw potatoes into a core fraction and a peel fraction containing the peel, eyes and rot; separately cooking the core fraction and the peel fraction; mashing said peel fraction to produce discrete free potato cells, aggregates thereof, and particles of peel, eyes and rot; adding water to said mashed peel fraction thereby forming a slurry; removing all of the peel, eyes and rot from said slurry; dewatering said slurry thereby removing free starch, soluble reducing sugars and proteins; mashing said cooked core fraction; combining said mashed core fraction in an unslurried form with said dewatered peel fraction so that a homogeneous mixture is obtained; and drying said mixture.

4. A process for preparing dehydrated mashed potatoes from raw potatoes leached to about 150° F.–180° F. to remove undesirable browning precursors therefrom wherein the potatoes are not frozen during processing which comprises dividing said raw potatoes into a core fraction and a peel fraction containing the peel, eyes and rot; separately steam cooking the core fraction and peel fraction; crushing said peel fraction to produce discrete free potato cells, aggregates thereof, and particles of peel, eyes and rot; adding water to said crushed peel fraction thereby forming a slurry; screening said slurry thereby removing substantially all of the peel, eyes and rot; dewatering said slurry thereby removing free starch, soluble reducing sugars and proteins; crushing said cooked core fraction; combining said crushed core fraction in an unslurried form with said dewatered peel fraction; mashing said combined fractions so that a homogeneous mixture is obtained; and drying said mixture.

5. The process of claim 1, wherein the peel, eyes and rot are removed from said slurry by screening to remove a major portion of the peel, eyes and rot; re-screening said slurry to remove substantially all of the remaining peel, eyes and rot and to subdivide said aggregates of cooked potato into discrete smaller potato fractions including free potato cells.

6. A process for preparing dehydrated mashed potatoes from raw potatoes wherein the potatoes are not frozen during processing which comprises slicing raw potatoes, immersing said sliced raw potatoes in water at a temperature of 150° F.–180° F. for a period of about 5 to 15 minutes to leach undesirable browning precursors therefrom; steam cooking said sliced leached potatoes for a period of about 15 to 30 minutes to a point whereat the potato slices are completely cooked throughout but not to a point where the starch therein begins to coalesce as a result of overswelling and bursting of the potato cells; crushing said cooked potato slices by passing them through a space of ⅛″ to ⅜″, the slices being thereby partially crushed and the peel, eyes and rot thereof remaining substantially intact with portions of clean potato adhering thereto; screening the thusly crushed potato slices so that 30% to 70% of the potato is separated as a clean core fraction from a peel fraction containing peel, eyes and rot; collecting the peel fraction and crushing it by passage through a space of 0.018″–0.024″; adding water to produce a slurry of said crushed peeled fraction in a ratio of one to two parts water to one part potato; screening said slurry through a U.S. #6 to #14 standard mesh screen to remove a majority of the peel, eyes and rot therefrom; pulping the slurry by passage thereof through a screen having openings of 0.018″–0.025″ to pass individual potato granules and subdivided large potato aggregates therethrough while retaining specks of peel, eyes and rot; dewatering said slurry by vacuum filtration to provide clean potato granules substantially free of soluble reducing sugars and some of the soluble potato proteins; recrushing said crushed core fraction; combining said recrushed core fraction with said dewatered clean potato granules so that a substantially homogeneous mixture is obtained; and drying said mixture.

7. A process for preparing dehydrated mashed potatoes from raw potatoes wherein the potatoes are not frozen during processing which comprises slicing raw potatoes, immersing said sliced raw potatoes in water at a temperature of 150° F.–180° F. for a period of about 5 to 15 minutes to leach undesirable browning precursors therefrom; steam cooking said sliced leached potatoes for a period of about 15 to 30 minutes to a point whereat the potato slices are completely cooked throughout but not to a point where the starch therein begins to coalesce as a result of overswelling and bursting of the potato cells; partially crushing said cooked potato slices to a condition where peel, eyes and rot thereof remain substantially intact with portions of clean potato adhering thereto; screening the thusly crushed potato slices so that 30% to 70% of the potato is separated as a clean core fraction from a peel fraction containing peel, eyes and rot; collecting the peel fraction and crushing it; adding water to produce a slurry of said crushed peeled fraction; screening said slurry to remove a majority of the peel, eyes and rot therefrom; pulping the slurry by passage thereof through a screen having openings sufficient to pass individual potato granules and subdivided large potato aggregates therethrough while retaining specks of peel, eyes and rot; dewatering said slurry to remove free starch, soluble reducing sugars and proteins to provide clean potato granules; recrushing said crushed core fraction; combining said recrushed core fraction in an unslurried form with said dewatered clean potato granules so that a substantially homogeneous mixture is obtained; and drying said mixture.

8. A process for preparing dehydrated mashed potatoes from raw potatoes wherein the potatoes are not frozen during processing which comprises slicing raw potatoes, immersing said sliced raw potatoes in water at a temperature of 150° F.–180° F. for a period of about 5 to 15 minutes; cooking said sliced potatoes to a point whereat the potato slices are completely cooked throughout but not to a point where the starch therein begins to coalesce as a result of overswelling and bursting of the potato cells; crushing said cooked potato slices to a condition where peel, eyes and rot thereof remain substantially intact with portions of clean potato adhering thereto; screening the thusly crushed potato slices so that a portion of the potato is separated as a clean core fraction from a peel fraction containing peel, eyes and rot; collecting the peel fraction and crushing it; adding water to produce a slurry of said crushed peeled fraction; screening said slurry to remove a majority of the peel, eyes and rot therefrom; pulping the slurry by passage thereof through a screen having openings of 0.018″–0.025″ to pass individual potato granules and subdivided large potato aggregates therethrough while retaining specks of peel, eyes and rot; dewatering said slurry to provide clean potato granules substantially free of soluble reducing sugars and some of the soluble potato proteins; recrushing said crushed core fraction; combining said recrushed core fraction in an unslurried form with said dewatered clean potato granules so that a substantially homogeneous mixture is obtained; and drying said mixture.

9. A process for preparing dehydrated mashed potatoes from raw potatoes wherein the potatoes are not frozen during processing which comprises slicing raw potatoes; leaching said sliced potatoes at about 150° F.–180° F. to remove undesirable browning precursors therefrom; steam cooking said sliced leached potatoes; dividing said potatoes into a core fraction and a peel fraction containing the peel, eyes and rot; crushing said peel fraction to produce discrete free potato cells, aggregates thereof, and particles of peel, eyes and rot; adding water to said crushed peel fraction thereby forming a slurry; screening said slurry to remove a majority of the peel, eyes and rot; re-screening said screened slurry to remove substantially all peel, eyes and rot and to subdivide said aggregates of cooked potato into discrete smaller potato fractions including free potato cells; dewatering said slurry thereby removing free starch, soluble reducing sugars and proteins; crushing said core fraction; combining said crushed core fraction in an unslurried form with said dewatered peel fraction; mashing said combined fractions so that a homogeneous mixture is obtained; and drying said mixture.

10. The process of claim 6, wherein the combined peel and core fractions are riced to form shreds prior to drying.

11. The process of claim 6, wherein the combined peel and core fractions are dried as individual potato granules.

12. A process for preparing dehydrated mashed potatoes from raw potatoes wherein the potatoes are not frozen during processing which comprises slicing said raw potatoes into about ¾″ thick slices; leaching said sliced potatoes at about 150° F.–180° F. in water; steam cooking said slices; crushing said slices; dividing said cooked crushed slices so that 30–70% of the potato is obtained as a clean core fraction; crushing the peel fraction to produce discrete free potato cells, aggregates thereof, and particles of peel, eyes and rot; adding to said crushed peel fraction at least 1 part of water to 1 part of potato thereby forming a slurry; screening said slurry to remove a majority of the peel, eyes and rot; re-screening said screened slurry to remove substantially all of the peel, eyes and rot and to subdivide said aggregates of cooked potato into discrete smaller potato fractions including free potato cells; dewatering said slurry thereby removing free starch, soluble reducing sugars and proteins; recrushing said crushed core fraction; homogeneously combining said dewatered peel fraction with said core fraction in an unslurried form; and drying said combined fractions.

13. A process for preparing dehydrated mashed potatoes from raw potatoes wherein the potatoes are not frozen during processing which comprises slicing said raw potatoes into about ¾″ thick slices; leaching said sliced potatoes for about 5–15 minutes in water maintained at a temperature of about 170° F. to remove undesirable browning precursors therefrom; steam cooking said slices for about 15–30 minutes; dividing said cooked slices so that 30–70% of the potato is obtained as a clean core fraction; crushing said peel fraction to produce discrete free potato cells, aggregates thereof, and particles of peel, eyes and rot; adding to said crushed peel fraction 1–2 parts of water to 1 part of potato there by forming a slurry; passing said slurry through a 6–14 mesh screen to remove a majority of peel, eyes and rot; re-screening said screened slurry to remove substantially all of the peel, eyes and rot and to subdivide said aggregates of cooked potato into discrete small potato aggregates including free potato cells capable of passing through 0.018″–0.025″ diameter openings; dewatering said slurry thereby removing free starch, soluble reducing sugars and proteins; crushing said core fraction; homogeneously combining said dewatered peel fraction with said core fraction in an unslurried form; and drying said combined fractions.

14. A process for preparing dehydrated mashed potatoes from raw potatoes wherein the potatoes are not frozen during processing which comprises slicing said raw potatoes into about ¾" thick slices; leaching said sliced potatoes for about 15 minutes in water maintained at a temperature of about 170° F. to remove undesirable browning precursors therefrom; steam cooking said slices for a period of about 21 minutes at a temperature of about 210–212° F.; dividing said cooked slices so that about 50% of the potato is obtained as a clean core fraction; crushing said peel fraction to produce discrete free potato cells, aggregates thereof, and particles of peel, eyes and rot; adding to said crushed peel fraction 1 part of water to 1 part of potato thereby forming a slurry; screening said slurry through an 8 mesh screen, spraying about 0.5 part of water per part of potato on said screen to remove a majority of peel, eyes and rot; re-screening said screened slurry to remove substantially all of the peel, eyes and rot and to subdivide said aggregates of cooked potato into discrete smaller potato aggregates including free potato cells capable of passing through 0.020" diameter openings; dewatering said slurry thereby removing free starch, soluble reducing sugars and proteins; crushing said core fraction in crushing rolls having a setting of about 0.042" between the rolls; homogeneously combining said dewatered peel fraction with said core fraction in an unslurried form; and drying said combined fractions.

15. A process for preparing dehydrated mashed potatoes from leached raw potatoes wherein the potatoes are not frozen during processing which comprises dividing potatoes into a core fraction and a peel fraction containing peel, eyes and rot; said core fraction and said peel fraction being steam cooked after leaching and before subsequent mashing; mashing said peel fraction to produce discrete free potato cells, aggregates thereof, and particles of peel, eyes and rot; adding water to said mashed peel fraction thereby forming a slurry; removing all of the peel, eyes and rot from said slurry; dewatering said slurry thereby removing free starch, soluble reducing sugars and proteins; mashing said core fraction; combining said mashed core fraction in an unslurried form with said dewatered peel fraction so that a homogeneous mixture is obtained; and drying said mixture.

References Cited in the file of this patent
UNITED STATES PATENTS

| | | |
|---|---|---|
| 2,490,431 | Greene et al. | Dec. 6, 1949 |
| 2,564,296 | Bostock | Aug. 14, 1951 |
| 2,787,553 | Cording et al. | Apr. 2, 1957 |